(12) United States Patent
Roseman et al.

(10) Patent No.: US 7,306,244 B2
(45) Date of Patent: Dec. 11, 2007

(54) TRANSPORTATION DEVICE HAVING A BASKET WITH A MOVABLE FLOOR

(75) Inventors: Bruce Roseman, Mt. Kisco, NY (US); Wayne Goldman, Morrisville, VT (US)

(73) Assignee: Kaback Enterprises, Inc., New York, NY (US)

( * ) Notice: Subject to any disclaimer, the term of this patent is extended or adjusted under 35 U.S.C. 154(b) by 0 days.

(21) Appl. No.: 11/153,568

(22) Filed: Jun. 14, 2005

(65) Prior Publication Data
US 2006/0091626 A1    May 4, 2006

Related U.S. Application Data

(63) Continuation-in-part of application No. 10/842,705, filed on May 10, 2004, now abandoned.

(60) Provisional application No. 60/469,193, filed on May 9, 2003.

(51) Int. Cl.
*B62D 39/00* (2006.01)
(52) U.S. Cl. ............................. 280/33.991; 280/33.997; 280/DIG. 4
(58) Field of Classification Search ........... 280/33.991, 280/33.995, 33.997, 47.35, DIG. 4; 187/244; 108/136
See application file for complete search history.

(56) References Cited

U.S. PATENT DOCUMENTS

| | | | |
|---|---|---|---|
| 2,468,115 A | 4/1949 | Saul, Jr. ..................... 312/71 |
| 2,812,187 A | 11/1957 | Nicholl, Jr. et al. .... 280/33.995 |
| 2,903,269 A | 9/1959 | Hennion | |
| 2,958,536 A | 11/1960 | Young ................... 280/33.995 |
| 3,112,832 A * | 12/1963 | Lachance et al. ........... 414/376 |
| 3,118,553 A * | 1/1964 | Rosenzweig ................ 414/469 |
| 3,787,063 A | 1/1974 | Oliver ................... 280/33.995 |
| 4,096,920 A * | 6/1978 | Heyn ........................... 180/11 |
| 5,042,622 A | 8/1991 | Smith et al. | |
| 5,123,665 A | 6/1992 | Levy ........................... 280/35 |
| 5,265,893 A | 11/1993 | Ettlin | |
| 5,575,605 A * | 11/1996 | Fisher ........................ 414/490 |
| 5,863,054 A | 1/1999 | Flores ................... 280/33.995 |
| 6,024,527 A * | 2/2000 | Soriano ...................... 414/345 |
| 6,123,343 A * | 9/2000 | Nolting et al. ......... 280/33.994 |
| 6,328,329 B1 * | 12/2001 | Smith ......................... 280/639 |
| 6,533,297 B2 | 3/2003 | Saccani ................. 280/33.995 |
| 6,676,139 B1 * | 1/2004 | Saccani ................. 280/33.991 |
| 7,080,844 B2 * | 7/2006 | Espejo .................. 280/33.995 |

* cited by examiner

*Primary Examiner*—Christopher P. Ellis
*Assistant Examiner*—Brian Swenson
(74) *Attorney, Agent, or Firm*—Lackenbach Siegel, LLP (57) ABSTRACT

There is provided a transportation device with outer and inner frames coupled to a receptacle so as to allow the receptacle to move vertically in response to loading and unloading of the device.

19 Claims, 12 Drawing Sheets

TRANSPORTATION DEVICE HAVING A BASKET WITH A MOVABLE FLOOR

CROSS REFERENCE TO RELATED APPLCIATIONS

This application is a continuation-in-part application of U.S. application Ser. No. 10/842,705 filed May 10, 2004 now abandoned and based, in turn, on Provisional Patent Application No. 60/469,193 filed May 9, 2003. The contents of each prior application are incorporated fully herein by reference.

BACKGROUND OF THE INVENTION

1. Field of the Invention

This invention relates to carts that preferably inter-fit with one another and are provided with features to facilitate the unloading thereof or otherwise assist in transferring items deposited therein without undue physical strain.

2. Description of the Prior Art

Wheeled shopping carts are made available in grocery stores, department stores, home improvement stores, and the like for the convenience of their customers to accommodate the transportation of items purchased to a check-out counter and/or to their vehicle. Thus, shopping carts of the general type being considered herein are well known. Invariably, shopping carts have a basket for holding user-selected items. Typically, the basket is mounted on a frame that has a handle and four caster-type wheels. In addition, shopping carts are usually nestable or stackable within one another to minimize storage space.

However, many users find the depth of the shopping cart basket to be very inconvenient because reaching items placed on the floor of the shopping cart basket requires the user to reach or bend down. Such bending movement may be painful or even difficult for certain users of a typical shopping cart. Thus, there is a need for shopping carts adapted to facilitate the retrieving of the contents therein without having a user to reach or bend down into the shopping cart basket.

Previous shopping carts with telescoping or movable baskets were intended to increase the size of the shopping cart basket in proportion to the quantity and/or weight of the items in the shopping cart basket. For example, U.S. Pat. No. 2,958,536 to F. W. Young discloses a telescoping grocery cart having means for increasing the lading (i.e., loading) capacity thereof. For another example, U.S. Pat. No. 3,787,063 to Oliver discloses a shopping cart or the like having a movable bottom wall displaceable between retracted and extended positions in accordance with the magnitude of the weight supported by the bottom wall. In addition, U.S. patent application Ser. No. 2002/0135145 to Saccani discloses a shopping cart with the ability to move in response to downward force.

However, all these previous shopping carts provide that the bottom wall of the shopping cart basket is initially or permanently set at a typical depth from the top of the sidewalls. In other words, previous shopping carts required that a user reach or bend down to reach and/or retrieve items placed on the bottom wall of the cart.

U.S. Pat. No. 5,863,054 to Flores describes a grocery cart platform lift, which is a vertically movable horizontal shelf that is normally positioned near the upper rim of the basket of the cart. The shelf is spring biased and as it becomes loaded, the shelf tends to move downwardly within the shopping cart basket. As the shelf is unloaded, it tends to move upwardly, thereby making it easier to unload the remaining items in the shopping cart. However, the shelf is mounted only to the front wall of the shopping cart basket by a pair of telescoping tracks. Each track has a single spring biasing the shelf in the upward position.

Providing a shopping cart with a short vertically movable shelf biased in the upward direction by a single pair of springs is an incomplete solution to problem. If the springs are highly elastic to allow quick lowering of the bottom wall, the springs can be easily over-loaded such that a number of items must first be removed from the shopping cart basket before the bottom wall will begin to rise. If the springs are only slightly elastic to allow quick rising of the bottom wall, the springs will inconveniently limit the available volume of the shopping cart basket unless several heavy items are loaded onto the bottom wall.

Inadequate biasing means for resiliently supporting a mass of a load is not the only problem associated with many of the known cart structures. Loading a cart is typically done without consideration of torsional or bending forces generated by a load. It is not unusual to see a cart overloaded with numerous shopping items that may be unevenly distributed within the basket or receptacle of the cart. As a consequence, loading and steering the cart are rather difficult due to the action of the torsional forces directed along different planes and tend to prevent both moving the cart along a relatively linear path and along an arcuate path, if a need exists. Furthermore, under certain circumstances, the overloaded cart may tip over on either of its sides due to uneven distribution of the weight inside the cart. In summary, many of the known cart structures may not be adequately configured to withstand torsional or bending moments generated by the load being transported.

A need, therefore, exists for a shopping cart that reduces the need for a user to bend while loading and unloading the basket.

Another need exists for a shopping cart that has a receptacle with a bottom wall movable in response to loading or unloading the receptacle.

Further, a need exists for a shopping cart that has a structure capable of withstanding lateral, torsional or bending forces typically generated by the load being transported.

SUMMARY OF THE INVENTION

The present invention provides a number of improvements in hand driven transportation devices directed to increase their stability. These improvements may be implemented separately from each other, or preferably in combination with each other, as in the embodiment described by the present invention as disclosed herein.

In light of the needs described above, the present invention provides a transportation device comprising a receptacle with a vertically movable bottom wall. The vertical movement of the bottom wall is controlled by a biasing assembly including multiple pairs of springs. The first pair of springs has a first maximum load capacity, while the second pair of springs has a second maximum load capacity that is greater than the load capacity of the first pair of springs. The first pair of springs is connected to either the fore or aft corners of the bottom wall. The second pair of springs is connected to the side edges of the bottom wall. Low-friction, non-binding rollers are attached to the upper end of each spring and engage respective guideposts. Preferably, to avoid trapping items (or fingers) in the sidewalls of the shopping cart basket as the bottom wall lowers, the side walls of the shopping cart are initially collapsed and subsequently expand as the bottom wall lowers. In addition, the shopping cart preferably has a hand brake that prevents movement of the shopping cart unless held open by a user.

In a further aspect of the invention, the inventive cart has a means for minimizing an impact produced by torsional forces, which are generated by the load being transported in the cart. The cart includes an outer supporting frame and an inner frame that is mounted on the supporting frame and operative to carry a receptacle so that torsional forces, generated by the load, are substantially minimized and prevent detrimental affect on the maneuverability and stability of the loaded cart.

The inner frame of the cart is made from a rigid material and has opposite uprights, which are supported by both pairs of springs, and a pair of longitudinal members, which bridge the uprights. The inner frame of the cart is coupled to the bottom of the receptacle and travel along a generally linear path in a substantially vertical plane in response to the increased or reduced mass of the load.

Rigidity of the inner frame and structural interaction between the inner and outer frames of the cart are sufficient to withstand and substantially minimize the impact of torsional forces that are generated by the load being transported, which is typically unevenly distributed around the receptacle and may caused a cart to tip over on its sides or front.

Opposite ends of the uprights each have a respective roller unit slidable along a plurality of guiding surfaces of the outer frame and, thus, providing relative displacement between the inner and outer frames. The uprights are dimensioned to allow the inner frame to slide at a distance corresponding to the maximum displacement of the basket's bottom relative to the top of the basket.

The above and other features of the inventive cart will become more readily apparent from the following detailed description of the invention in conjunction with accompanying drawings, in which:

DESCRIPTION OF A PREFERRED EMBODIMENT

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. As used herein, the term "moves vertically" includes movement in a direction normal to the ground and any other non-normal direction having a vertical component. These and similar directional terms should not be construed to limit the scope of the invention in any manner. The words "connect," "couple," and similar terms with their inflectional morphemes do not necessarily denote direct and immediate connections, but also include connections through mediate elements or devices.

Inventive transportation device has many of the functional characteristics of conventional shopping carts in that it is a wheeled container adapted to be manually propelled along the aisles of a store or market and have articles deposited therein.

The transportation device of the present invention is particularly useful when the device user needs to transport a load that typically generates a variety of multidirectional forces during loading, transporting and unloading of a variety of items, which are further referred to as a load. A shopping cart that has become an indispensable tool in stores and supermarkets is often tipped over because a heavy load is not properly placed within a receptacle. The structure of the present inventive transportation device is configured to minimize such a possibility and provides the device with stability.

Referring to FIGS. 1 through 4, a transportation device 10,10A is configured with an outer frame 50, 50A receiving an inner frame 100 that is operative to move relative to outer frame 50 in a generally vertical plane in response to loading or unloading a load into or from a receptacle 150. For all later discussion, those skilled in the art are to understand that the principals provided by devices 10, 10A are generally interchangeable enabling the present invention to meet the goals noted above.

Figure 3:
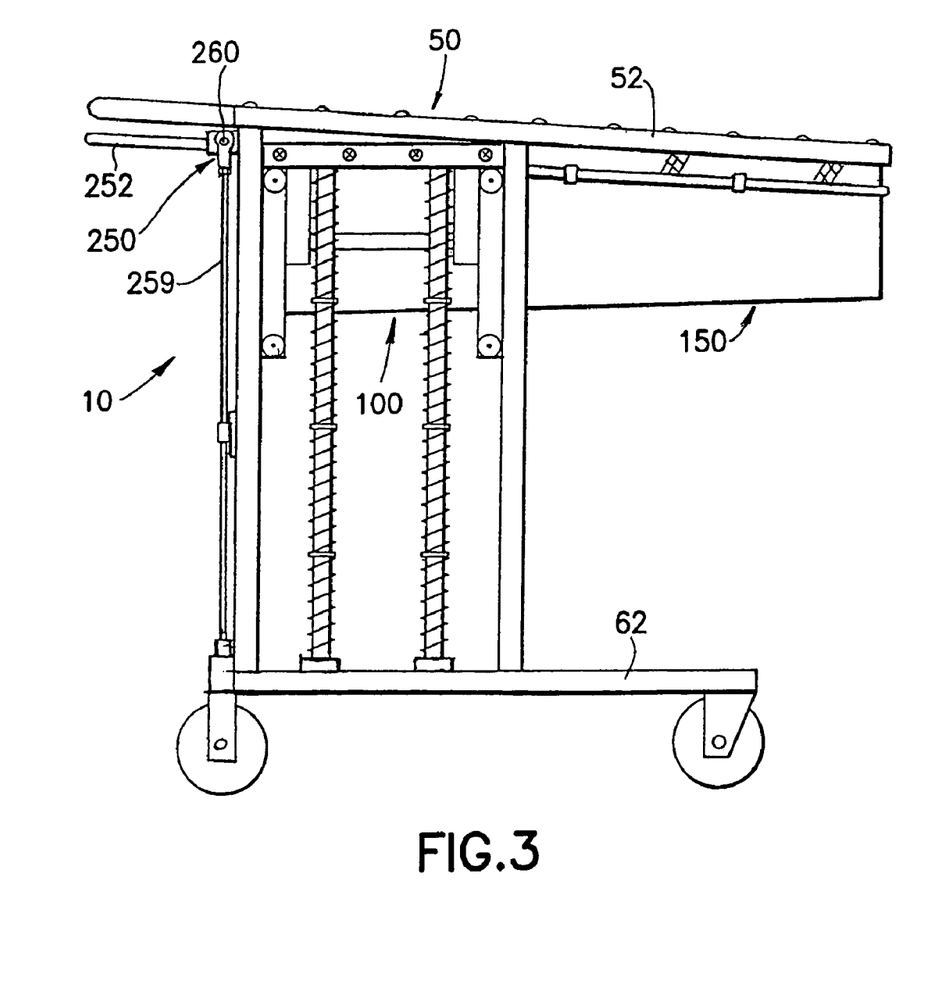
FIG. 3 is a side view of the shopping cart of FIG. 1.
Figure 4:
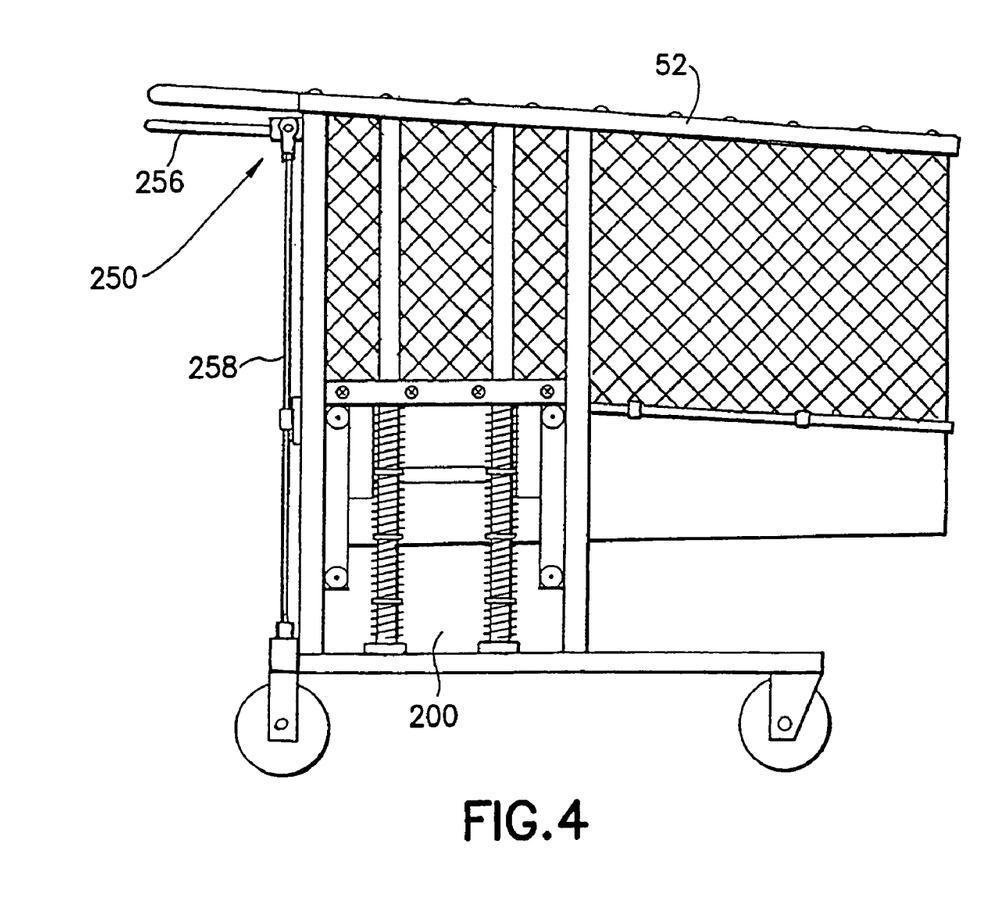
FIG. 4 is a side view of the shopping cart of FIG. 2.

The top of receptacle 150 is either fixedly or removably coupled to respective outer frames 50, 50A, whereas its bottom wall is displaceably supported by inner frame 100 for movement between the retracted and extended positions, as better illustrated in FIGS. 3 and 4, respectively. Further, the inner frame to be considered should be operative to urge the bottom wall toward its retracted position, but permit displacements therefrom toward its extended position whenever loads of sufficient magnitudes are supported thereon. The frame may be functionally independent from the outer frame or functionally dependent on one it.

Configuration of the inner and outer frames allow the entire structure of devices 10A, 10 to withstand a plurality of bending or torsional forces, which may be generated by the load and tend to tip device 10, 10A over on its sides or front. In addition, a combination of inner and outer frames 100 and 50, 50A, respectively, as well as receptacle 150 allows the bottom of the receptacle to move vertically in response to modifying the mass of the load.

Outer frame 50 includes a pair of substantially parallel sections extending along horizontal axes A-A' and B-B' and spaced from one another at a distance, and a third section extending generally in a vertical plane and configured to rigidly couple the first and second sections of the outer frame.

Figure 1:
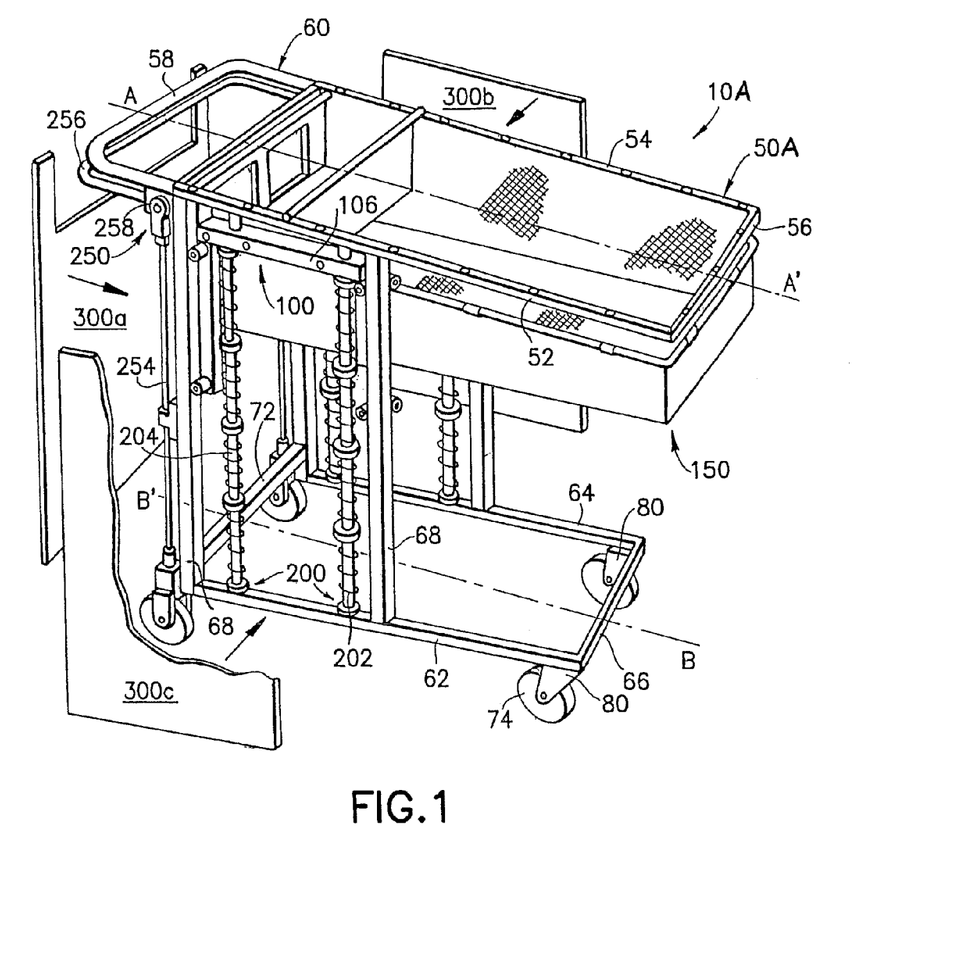
FIG. 1 is a perspective view of a shopping cart according to the present invention shown in an unloaded position with shielding removed.
Figure 1A:
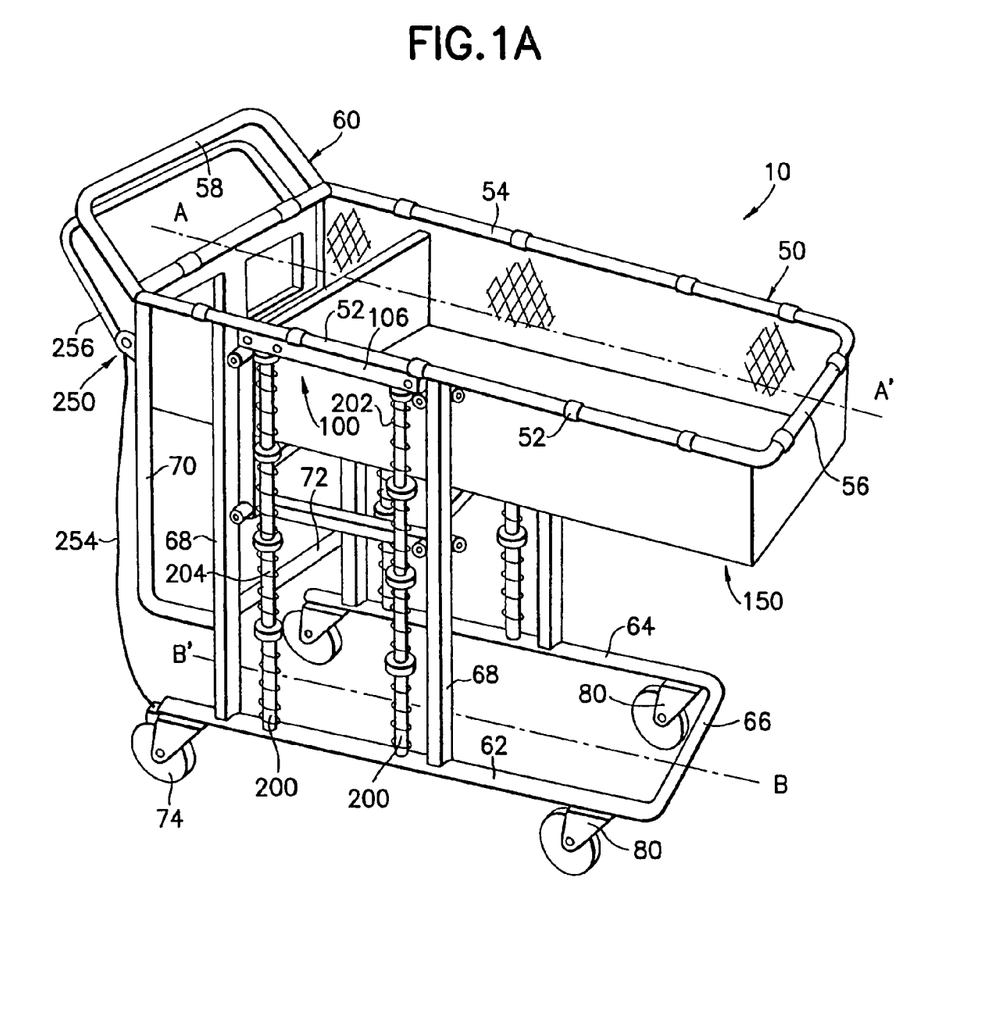
FIG. 1A is a perspective view of a shopping cart according to another aspect of the present invention in an unloaded position without shielding.

In particular, as better shown in FIGS. 1. 1A, the first or upper section of outer frames 50, 50A include a pair of elongated horizontal elements 52 and 54, whose distal and proximal ends are bridged by cross elements 56 and 58, respectively. While, as illustrated, the proximal ends of elongated elements 52 and 54 are bent upwardly and, along with proximal cross element 58, define a handle 60, the elongated elements can be straight. If the handle is removably attached to the proximal ends of elongated elements 52 and 54, it is necessary to provide the device 10 with any conventional connecting means for coupling the handle to the proximal ends of elongated elements 52 and 54 (not shown).

Cross-element 56 may be coupled to the distal ends of elongated elements 52 and 54 fixedly or removably. Alternatively, the entire upper or first section of outer frames 50, 50A may be formed as a one-piece structure by a variety of methods including, but not limited to, extrusion, welding, or molding. A choice of materials for manufacturing the outer frame is unlimited and, depending on a particular environment, may include engineering plastics, metals or even wood. Preferably, the elements of the outer and inner frames are made from hollow members for reduced weight. Customarily, the carts are made from metal providing the entire structure with the desired degree of rigidity and minimizing a potential mechanical damage as a result of the device being harshly used.

The cross-section of the upper section of outer frames 50, 50A varies, but, preferably, is generally rectangular or tubular. In accordance with various aspects of the frame's shape, elongated elements or tubes 52 and 54 may extend either parallel to one another or converge toward the distal end of the device 10, 10A.

The second or lower section of outer frame 50, 50A is substantially parallel to the upper section and, in many respects, is structured substantially similarly to the upper section. Like the upper section, the lower section is configured with a pair of elongated section 62 and 64 extending either parallel to axis B-B', B-B" or converging towards the distal end of device 10. In either case, the distal ends of elongated elements or tubes 62, 64 are connected by a cross element 66 that may be either removably or permanently coupled to the elongated sections. In contrast to the upper section, the proximal ends of elongated members 62 and 64 are free and, thus, not connected to one another defining an opening that is configured to nest a distal portion of a new transportation device, when, for example, a plurality of transportation devices are being stored.

Connecting the upper and lower sections of outer frames 50, 50A by a third section forms a strong rigid body capable of supporting heavy loads. The third or vertical section of outer frames 50, 50A may include a vertical element extending between a respective pair of elongated elements 52-62 and 62-64 of upper and lower sections, respectively.

In accordance with one aspect of the invention, as shown in FIGS. 1-10, the vertical section may include a plurality of spaced apart bars 68 interconnecting midsections of the elongated elements of the upper and lower sections of outer frame 50, 50A. Besides providing the required structural rigidity, bars 68 play an important role as a guide surface for directing inner frame 100 along a generally linear vertical path, as will be explained below.

As shown, bars 68 each have a substantially rectangular cross-section, but even though such configuration is desirable, the use of other various cross-sections, which may include, but no limited to, a circular cross-section or a polygonal or non-regular cross-section different from the shown rectangular one, may be utilized. Bars 68 may be extruded along with the upper and lower sections, welded to the longitudinal elements of these sections or removably attached thereto.

A further aspect of the third section of upper section may include a one-piece element extending between and coupling the upper and lower sections of outer frame 50. Forming the guide surfaces then can be accomplished by providing the single elongated vertical piece with a plurality of slots (not shown).

To further ensure that outer frame 50, is structured sufficiently rigidly for transporting extremely heavy loads, bars 68, located close to the proximal end of device 10, may have a pair of L-shaped support elements 70 (FIG. 1A only) extending between the lower proximity of bars 68 and the angled regions of the proximal ends of elongated elements 52-54 of the upper section. Finally, as diagrammatically shown in FIG. 1, proximally positioned bars 68 may be further interconnected and thereby stiffened by a cross element 72. To provide nesting of a subsequent device in the shown device 10, cross element 72 is spaced at a sufficient distance from the ground so as to allow the lower section of the subsequent device to move under it and be nested in the previously parked device 10.

Displacement of device 10, 10A in response to a driving force applied by the device user to handle 60 is realized by a wheel assembly, which is mounted on elongated elements 62 and 64 of the lower section of outer frame 50. Preferably, the wheel assembly includes caster-type, low friction and non-binding rollers or wheels 74, which are most commonly used type of wheel for shopping carts. Wheels 74 may be connected to elongated members 62, 64 by any axle allowing the wheels to rotate about a generally horizontal axis.

In accordance with one aspect, each wheel 74 may be mounted to a bracket 80, which, in turn, is fixed to the underside of elongated members 62, 64. To turn device 10, 10A, the device user applies a driving force to one of opposite ends of handle 60. Having the bracket fixed to outer frame 50 provides the device 10 with limited maneuverability and wide turns.

Such an inconvenience may be overcome by mounting brackets 80 to outer frame 50 in a rotational manner. The simplest configuration may include a pin extending from the downside of elongated elements 62, 64 and having its low end received in a respective recess, which is made in the top of bracket 80 (not shown). Coupling between the free end of the pin and recess prevents the pin to withdraw from the recess, but allows the wheel to rotate about a vertical axis relative to outer frame 50. This aspect of the wheel assembly provides the device 10 not only with greater maneuverability and the ability to make sharp turns, but also reduces the capability of the device to remain stable when lateral forces are applied to the device 10.

Figure 5:
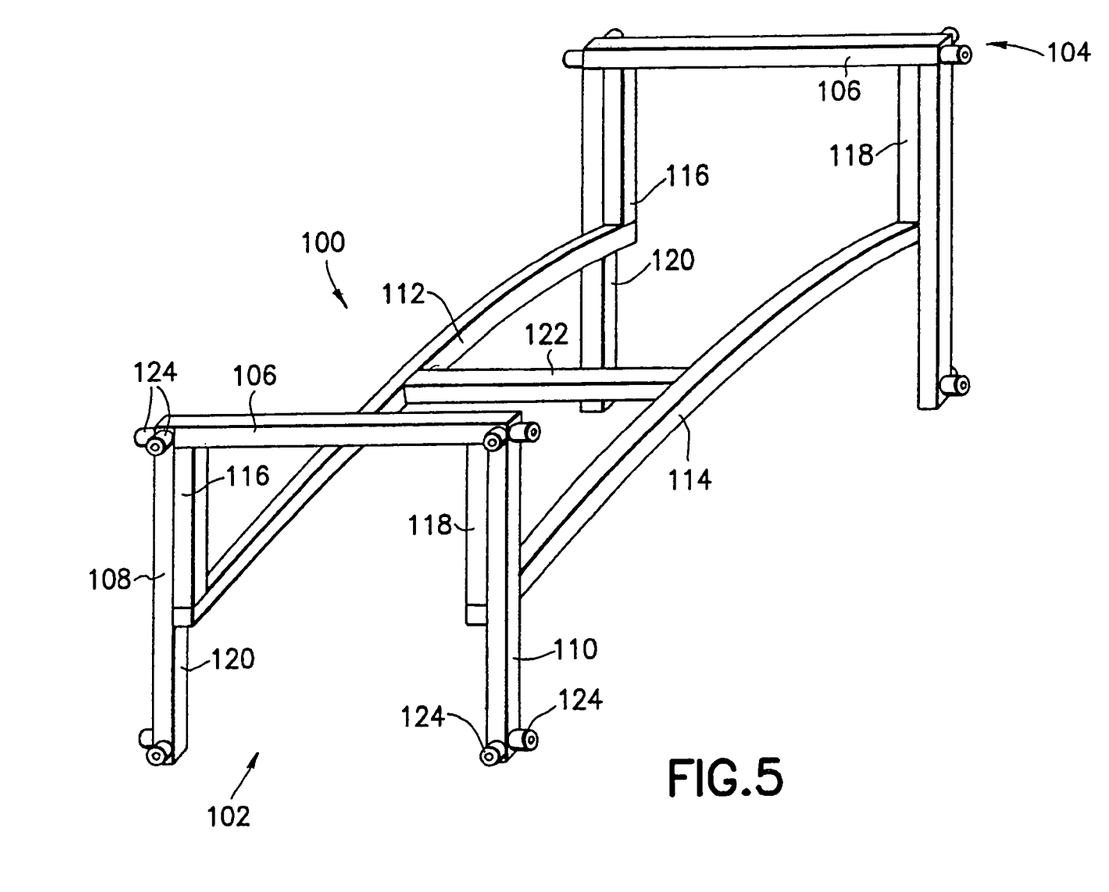
FIG. 5 is a perspective view of an inner movable frame of the shopping cart of FIGS. 1 through 4.
Figure 6:
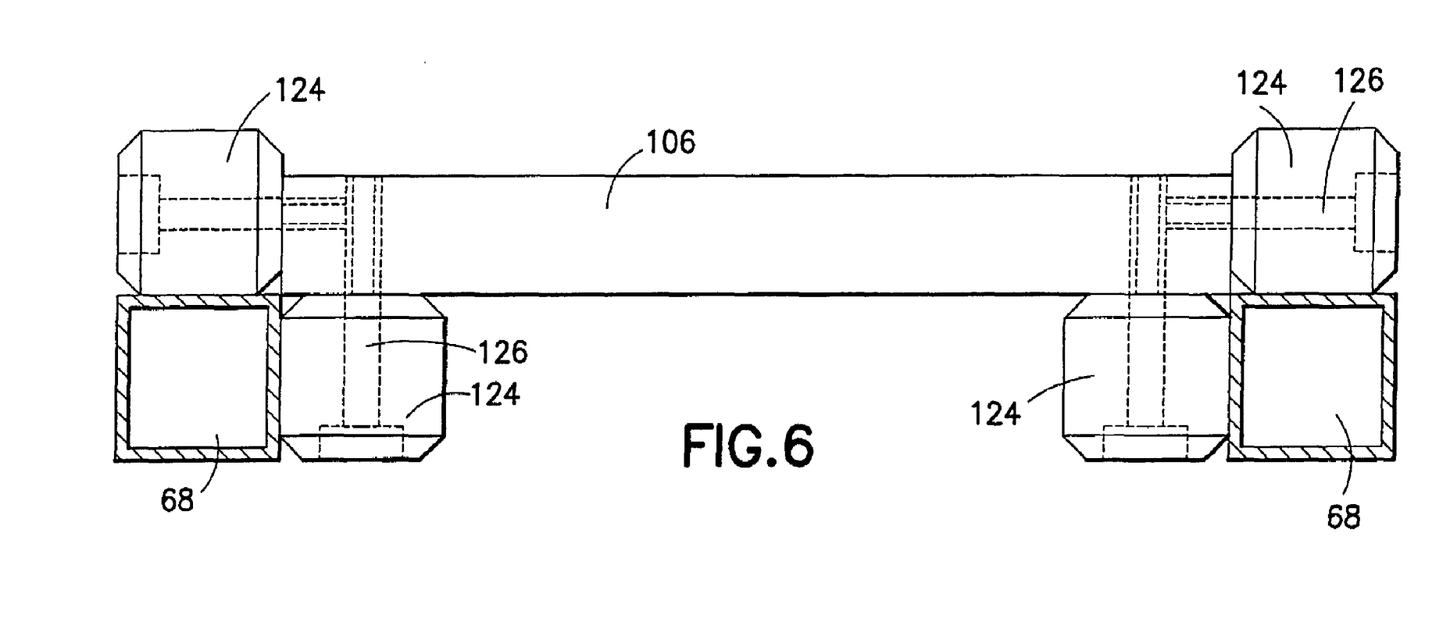
FIG. 6 is a top view illustrating a roller assembly providing displacement between the inner movable frame and an outer frame of the shopping cart of FIGS. 1-4.

In an aspect of inner frame 100, better illustrated in FIG. 5, it should be noted that the inner frame might be manufactured as a one piece or as a combination of a plurality of pieces that are coupleable with one another to assume the shown configuration. The inner frame has three functions: a) it is configured as a cradle for the receptacle's bottom, b) it serves as a part of guide assembly for displacing receptacle 150, and c) it functions as part of a shock-absorbing mechanism capable of minimizing the impact of torsional, bending and/or lateral forces acting upon the entire device 10.

In particular, the outer frame has a pair of opposite uprights 102 and 104 each provided with a generally U-shaped cross-section that during assembly of the device 10 is inverted, as shown in FIG. 5. Each of the uprights 102, 104 is mounted between a respective pair of elongated members 52-62 and 54-64 of the upper and lower section of outer frame 50 and has a vertical dimension allowing the entire inner frame to travel between these elements in response to displacement of the load into or out of receptacle 150.

A combination of axially extending component 106, which, thus, extends substantially parallel to axes A-A', A-A" and B-B', B-B" (FIGS. 1, 1A), and a pair of vertically extending components 108 and 110 defines each of the U-shaped uprights. Cross components 112 and 114 span between the uprights and connect them to form rigid inner frame 100. One or several additional reinforcing components 122 may extend between cross components 112, 114 and coupled thereto to overall increase the capability of the inner frame to support heavy loads.

Several aspects of inner frame 100 are envisioned within the scope of the invention. One of the aspects, for example, is shown in FIG. 5 illustrating U-shaped cross components 112 and 114. In one aspect, cross-components 112 and 114 each have a pair of vertically extending portions 116 and 118 coextending with a portion of vertical components 108 and 110 of the U-shaped uprights, respectively. Each of the vertical portions 116, 118 is preferably extends along an inner face 120 of the component 108, 110 and provides for the desired positioning of receptacle 150 within inner frame 100. Furthermore, as illustrated in FIG. 5, cross components 112 and 114 are slightly curved, but may be of a different shaped (i.e., straight). Regardless of the cross-section of the cross components, structural combinations of the uprights and cross components are shaped and dimensioned to reliably receive the receptacle 150.

A further aspect may involve uprights 102 and 104. While the U-shaped cross-section has its advantages, such as fewer parts and a relatively light mass, depending on a particular application of device 10, the free ends of vertically extending components 108 and 110 of the uprights may also be bridged (not shown) providing, thus, each of the uprights with a rectangular cross-section.

As part of the guide assembly for linearly displacing receptacle 150, inner frame 100 has a plurality of rollers 124 provided on vertically extending components 108 and 110 of each upright 102 and 104. Preferably, rollers 124 are arranged in multiple pairs and positioned so that the opposite ends of vertically extending components 108, 110 each have a respective pair of diverging rollers 124.

As shown in FIGS. 1-4, properly mounted outer frame 50 has a plurality of rollers 124 sliding along bars 68 of the third section of outer frame 50. Since the bars 68 each have a substantially rectangular cross-section, the diverging rollers of each pair of rollers slide along adjacent faces of the bar 68 minimizing the possibility of deviation of the receptacle 150 from a linear path during its displacement. The rollers are made from a high plastic material including, but not limited to, Nylon or Acetal.

Roller bearing 126 (FIG. 6) are functionally attached to the inner frame. Since variously dimensioned outer frames 50, 50A can be utilized to carry out the main concept of the invention, inner frame 100 has to be dimensionally adjusted to properly cooperate with the various dimensions of the outer frames. To meet this need, the roller assemblies are provided with means for adjusting (not shown) that enables each roller 124 to extend at a controllably variable distance from inner frame 100 and rotationally abut respective bars 68 of outer frame 50.

During loading or unloading of receptacle 150, as shown in FIG. 1 through 4, for example, the distal area of receptacle 150 is impacted by a downwardly directed force, which may cause device 10, 10A to tip over its distal end. However, a relatively large contact area between rollers 124 and juxtaposed surfaces of bars 68 and structural rigidity of the inner and outer frames, in combination, absorb this force providing device 10 with an additional resistance to the tipping forces. Similarly, lateral forces acting upon device 10 can also be largely absorbed by the above-discussed components providing the device user with the smooth steering of the device.

Mounting of the inner frame 100 is realized by a spring assembly 200 (FIGS. 1 through 4 and 7) biasing inner frame 100 upwardly and including a plurality of spring elements 202 cooperating with axially extending components 106 of uprights 102 and 104 of inner frame 100 by biasing them upwardly to counteract the load which is placed in receptacle 150. Spring elements 202 each are supported by a respective pole 204, preferably made of strong engineering plastics, such as Nylon, or metal with a low friction coefficient. As better seen in FIG. 7, poles 204 each extend from elongated elements 62 and 64 of outer frame 50 through a spring compressor 236, which, in turn, is traversed by axial component 106 of inner frame 100.

Figure 7:
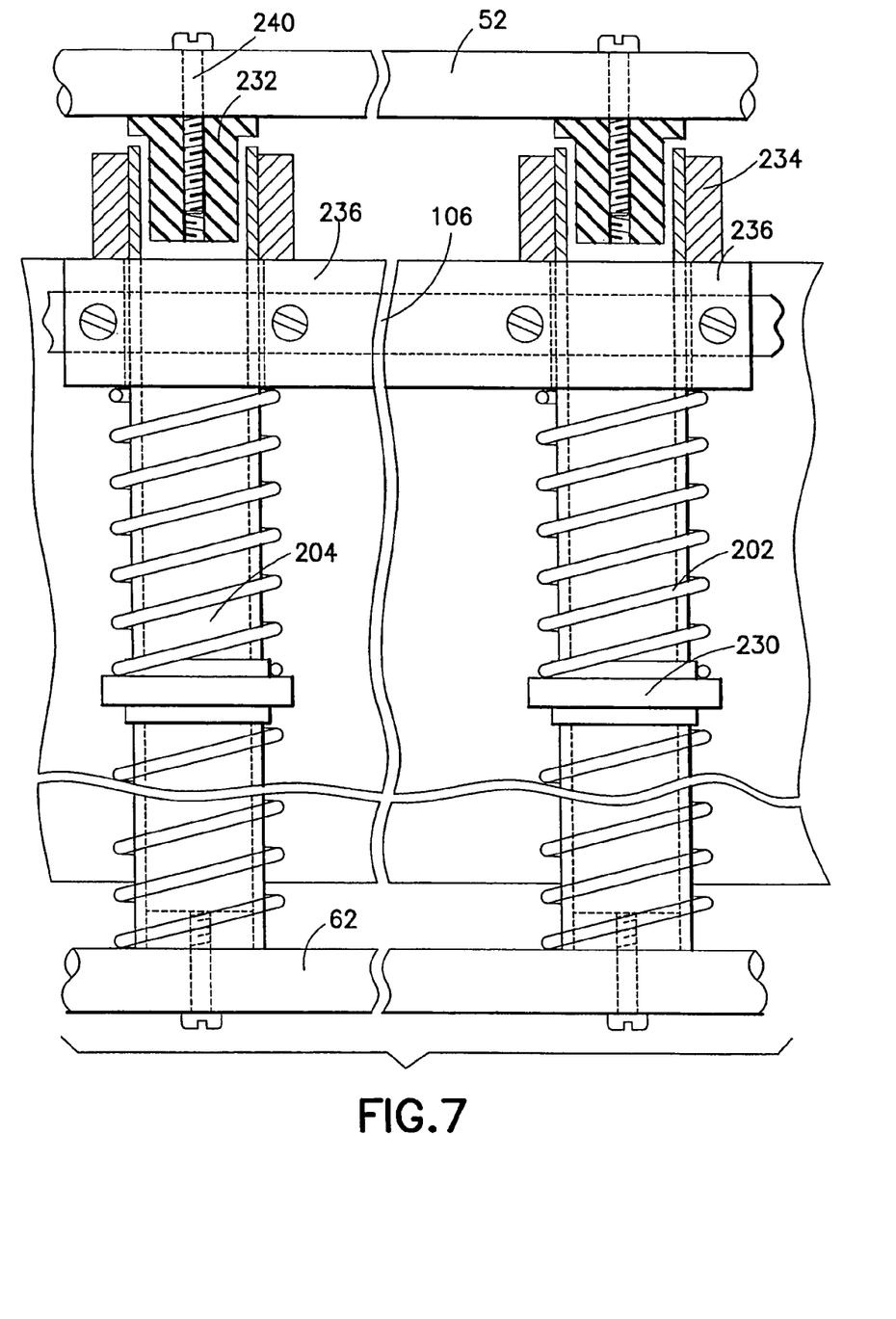
FIG. 7 is partially cross-sectioned elevational view of a spring assembly.

Upper ends of poles 204 terminate at a distance from elongated elements 52 and 54 of first section of outer frame 50 and configured to receive elastomeric bushings 232 that are removably attached to elongated elements 52 and 54 of outer frame 50 by mounting screws 240. The bushings each are positioned within a respective upper end of pole 204 in a spaced apart manner so as to prevent a direct contact between the poles and bushing if device 10 experiences strong lateral forces. A pair of side restrictors 234 each flank a respective one of upper ends of poles 204 and configured to minimize axial displacement of the poles in response to variously directed forces applied by the load or any other external source.

The springs 202 each are braced between the underside of spring compressor 236 and the top of elongated members 62 and 64 of outer frame 50. The rate and location of spring elements 202 are so selected that these elements are capable of self-balancing and substantially uniformly distributing the mass of the load received in or removed from receptacle 150. In other words, even if any particular area of the bottom of receptacle 150 is, for example, loaded with a greater mass than the rest of the receptacle, the spring elements are operative to distribute the overall mass so that the receptacle's bottom, which is displaceably fixed to the inner frame, lowers in a substantially horizontal plane.

In accordance with one aspect of the invention, each spring element 202 is configured with a single spring having a uniform rate. A further aspect includes the one-spring element provided with various string rates. Yet in a further, particularly preferable aspect, each spring element 202 includes a plurality of springs each provided with a different spring rate. The springs with different spring rates are held in position by plastic spring aligning bushings 230 (FIG. 7).

Spring elements 202 that can be advantageously utilized by the inventive structure include, but are not limited to, leaf springs, coil springs, air springs, progressive-rate springs, single-rate springs, torsion springs, pneumatic struts, hydraulic struts, natural resilient compounds like rubber, synthetic resilient compounds like urethane foam or EPS foam, or any other suitable construction and/or compound adapted to resist either compression or extension. Preferred support structures for the present invention are coil springs adapted to resist compression.

It is not unusual to see device 10, 10A moving voluntarily due to uneven surfaces or an unintentional force applied to the device when it is parked or left unattended. To prevent uncontrollable movement of the inventive device, it is provided with a brake assembly 250 (FIGS. 1, 1A, 3, 4, 8 and 9) configured to arrest the movement of the device when it is not in use.

Figure 2:
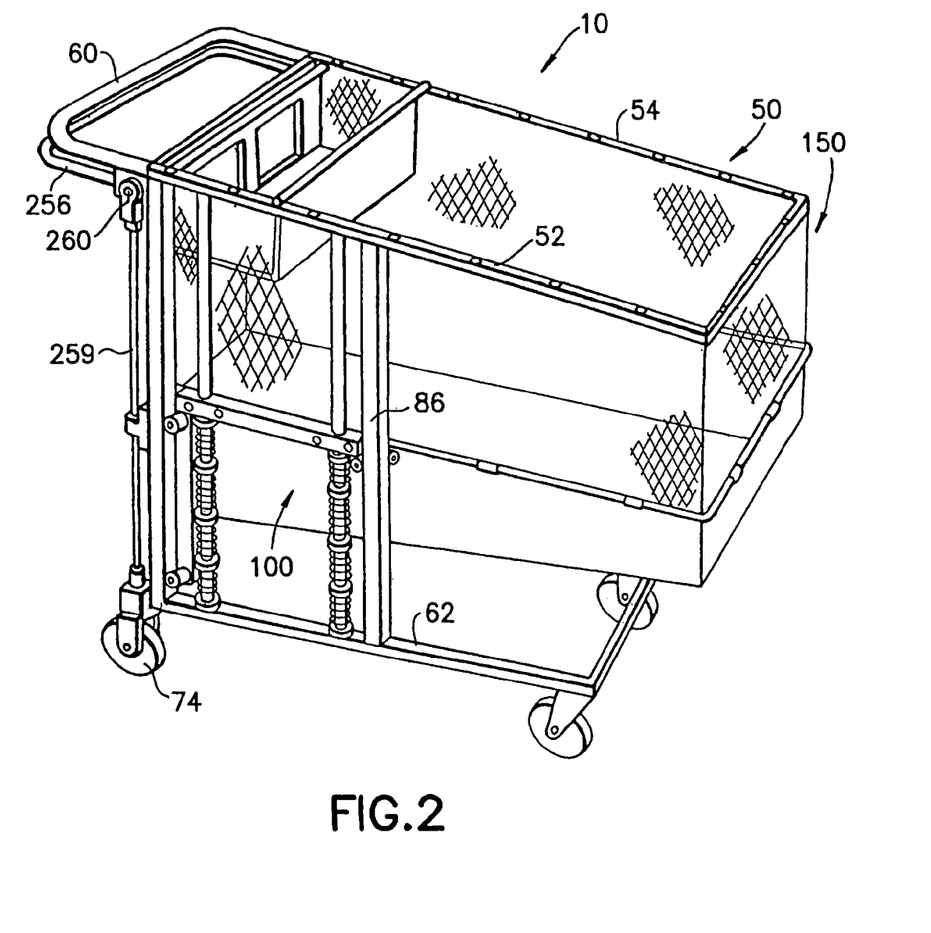
FIG. 2 is a perspective view of the shopping cart of FIG. 1 illustrated in a loaded position.

As better shown in FIGS. 1 through 3 (Excluding FIG. 2A), an actuating component including a brake handle 256 and a transmission element is coupled under handle 60 to outer frame 100. In accordance with one aspect, the transmission component has a flexible cable 254 attached to brake handle 256, which, in turn, is hingedly mounted by a hinge 258 to L-shaped element 70 of outer frame 100. In a rest or parking state of device 10, the cable is resiliently biased downwardly to have a pad assembly, as will be explained in reference to FIGS. 8 and 9, firmly abut a respective one of proximal wheels 74. As the device user applies a squeezing force to brake handle 256, which pivots upwardly, the cable is tensioned and the pad assembly is lifted, thereby releasing the wheels.

In a further aspect, as shown in FIGS. 2, 3 and 4, the transmission component includes a pair of solid rods 259 (FIG. 3) articulately coupled to break handle 256 by a coupling 260. The mechanics of braking is analogous to the above described and includes application of a pulling force causing rods 259 to lift the pad assembly and release wheels 74.

Figure 2A:
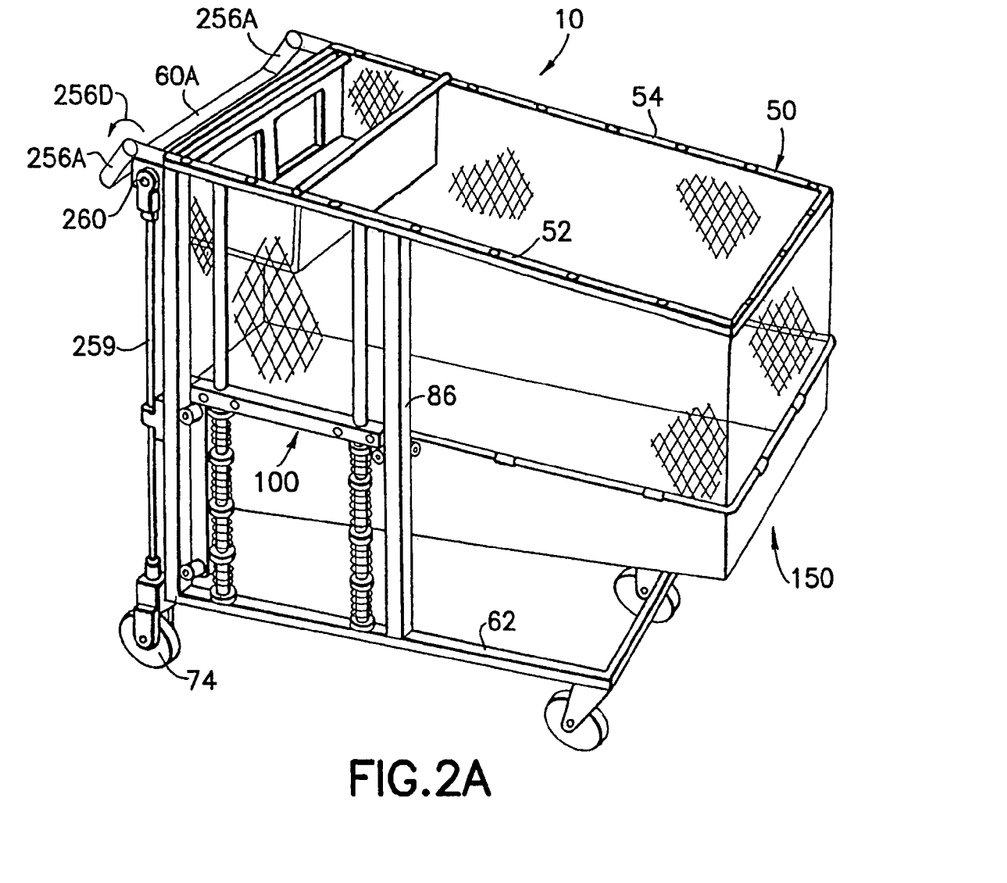
FIG. 2A is a perspective view of an alternative embodiment of the present invention with actuating handle grips.

Referring now to FIG. 2A, an alternative handle design is provided that incorporates the break and push handles together in unit handle mechanism 60A, that incorporates break handles 256A, 256A joined by a cross bar (shown), and pivotable about pivot center 256D. This present design provides substantial functional benefit to those of small stature, of small or delicate hand or bone structure, and those who do not wish to squeeze the handles together to release the break mechanism. As depicted, a user pushing cart 10 would depress handle 60A about pivot 256D, raising break bar 259, and releasing the breaking mechanism allowing the cart to move. As a consequence of this adaptive embodiment, the cart may be used by a broader section of the populace. As a further consequence cart motion is easier. As discussed above, the break mechanism is designed to default to an on/engaged position preventing unintentional cart motion. Such engagement is immediately removable by simply pushing the cart in a forward direction. Thus, this alternative design provides a useful alternative engagement and disengagement system.

In each embodiment discussed above, it will be recognized by those of skill in the art, that as the break system defaults in an on position, it would be convenient to have a break disengagement system available at the front locus of the cart. This particular system would provide main benefit where a cart user is positioned in front of the cart and needs to pull a fully loaded cart forward. Rather than dragging the cart against the break system friction, the user may simply disengage the break system. Such a front-end disengagement system may be readily provided via a flexible cable release system (similar to element 254) with a release handle at the front (not shown)

Figure 8:
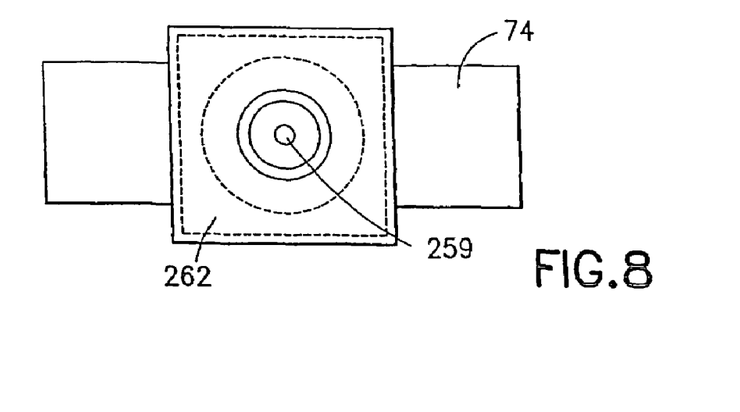
FIG. 8 is a top view of a brake assembly of FIGS. 1 through 4.
Figure 9:
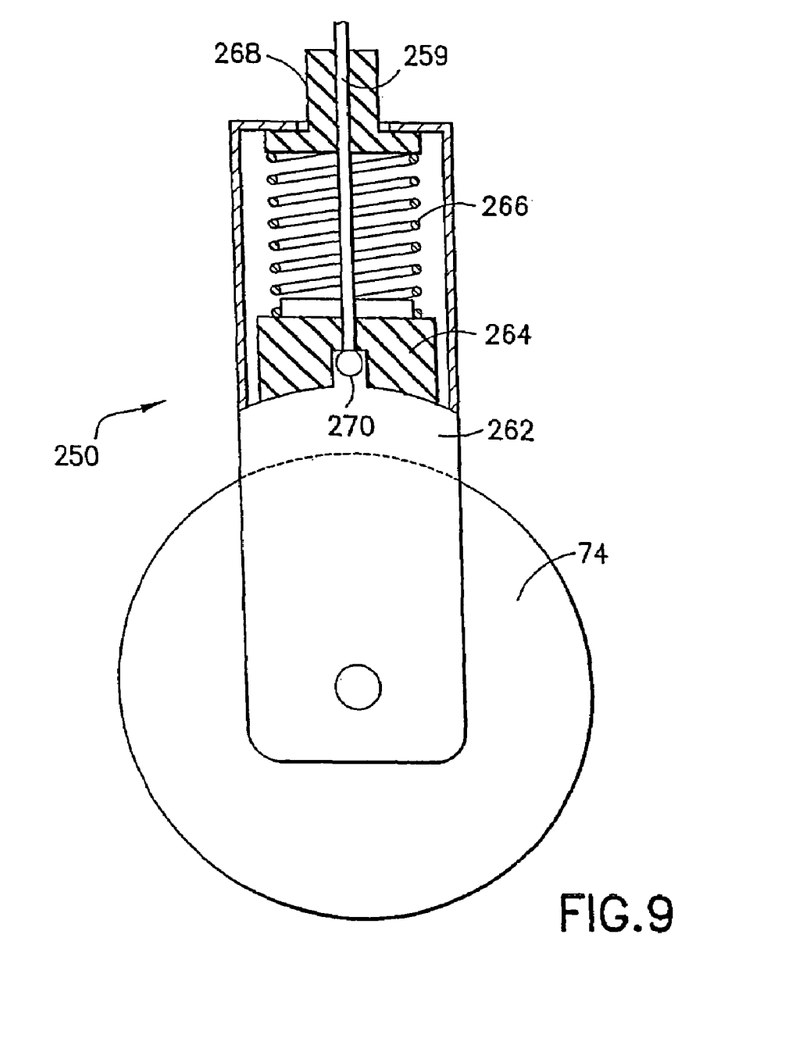
FIG. 9 is a partially cross-sectioned side elevational view of the brake assembly of the shopping cart.

FIGS. 8 and 9 illustrate the pad assembly including a brake housing or casing 262 enveloping the lower end of rods 259, brake pad 264, which has a lower segment shaped complementary to wheel 74, resilient element 266, and inverted T-shaped bushing 268, which centers rod 259 within housing 262. In the parking state of device 10, 10A, resilient elements 266 biases the pad assembly downwardly enabling, thus the lower segment of brake pad 264 to abut the wheel. A rate of resilient elements is so selected that the device user typically does not apply a substantial force. However, the spring rate is sufficient for the resilient element to reliably press brake pad 264 against the wheel. While the upper end of rods 259 is centered by T-shaped bushings 268, the lower end of these rods is formed with an enlarged ball 270 preventing disengagement of the rods from the pad.

The pad assembly disclosed above is exemplary and can be modified. For example, instead of the springs, brake assembly 250 may be provided with a pneumatic means. Still a further alternative configuration can include a hydraulic means. Both aspects can be readily adapted by ordinary skilled workers.

Figure 10:
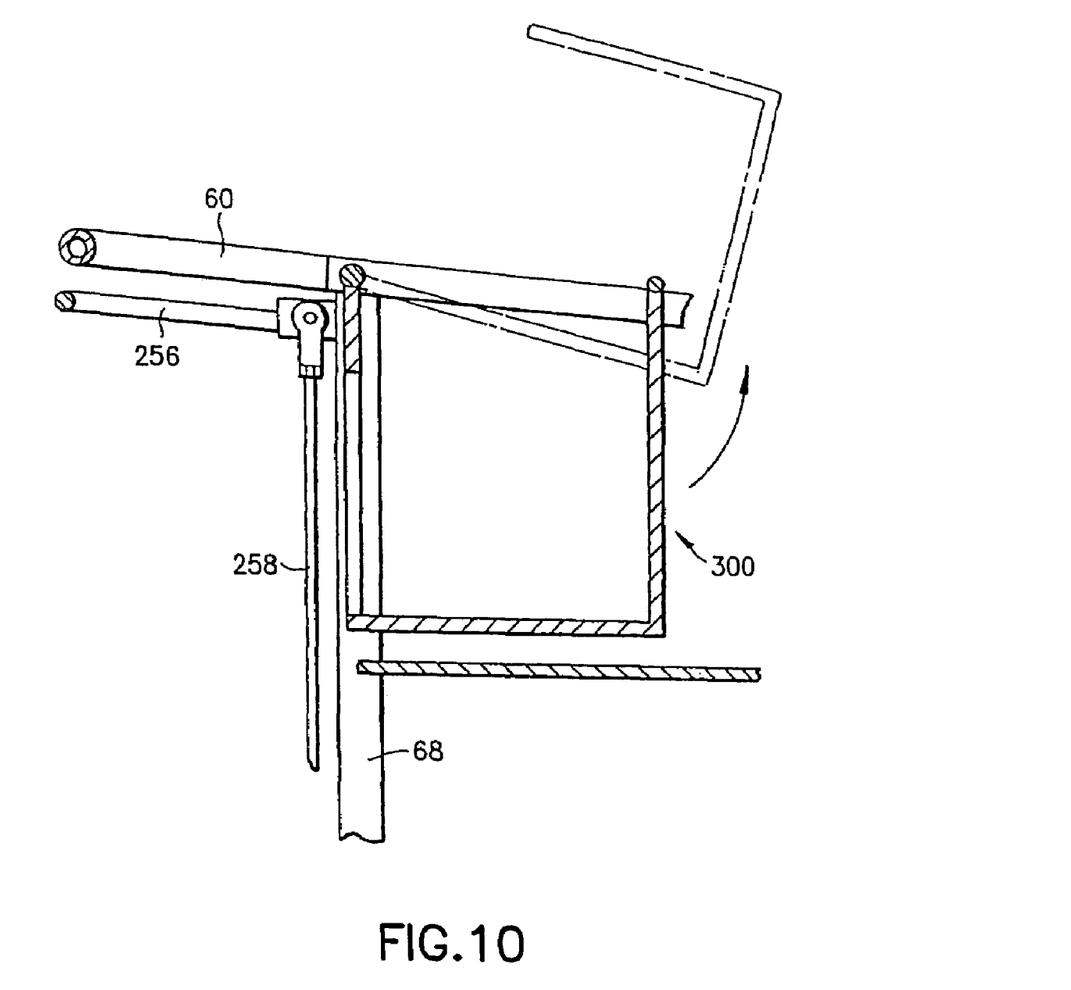
FIG. 10 is a partially cross-sectioned side elevational view illustrating a pivoting child's seat of the shopping cart of FIGS. 1-4.

As is known, shopping cards are conventionally provided with a secured or temporarily-removable child seat. As shown in FIG. 10, inventive device 10 has a seat 300 pivotally mounted on bars 68 of third section of outer frame 100. When in use, seat 300 is swung into receptacle 150, as shown in solid lines in FIG. 10; otherwise, seat 300 may be pivoted in a position shown in phantom lines. Pivoting to the lifted position can, of course, be performed by the device user, or by the distal end of a subsequent device that, thus, fits into the opening typically closed by the back of seat 300.

In the embodiment shown in the Figures, the child seat comprises a flexible hammock supported by a bar. The bar may be moved from an open position to a closed position along slots provided at the top of the basket. The use of the flexible hammock child seat reduces the ability of a child riding in the seat to gain leverage and lift out of the seat. The child seat may optionally include a safety belt (not shown). For example, the safety belt may be generally Y shaped with two points of securement on the bar and one point of securement on the rear wall of the cart, between the child's legs. Although the child seat shown in the figures comprises a flexible hammock, any other suitable type of child seat may optionally be used.

As shown in alternative FIG. 1, outer protective shielding elements 300A, 300B, and 300C may be mounted on the support frame to minimize the risk of damage to the device or to users by pinching and trapping. Shielding elements are shown as solid plates, but may be made of non-rigid materials, or may be shaped as protective gratings or shields in a manner that matches the spirit and scope of the present disclosure.

Receptacle 150 is constructed with soft (i.e., fabric or non-metallic) side walls or bottom supported by one or more metal frames or sub-frames. In one alternative construction, the bottom of receptacle 150 is of metal construction and is suspended from the outer frame upper section by flexible sidewalls of fabric mesh. The advantages of a non-metallic material include the feature of eliminating the possibility of fingers or items being crushed by the collapsing sidewall because, unlike metal rods, a non-metallic sidewall will yield.

As discussed above, while lower support element 150 is show being rigid this is not mandatory where the other functional features of the device remain available. For example, a bottom surface, may be provided from a flexible or semi-flexible cloth or plastic material, supported by a frame.

Figure 11:
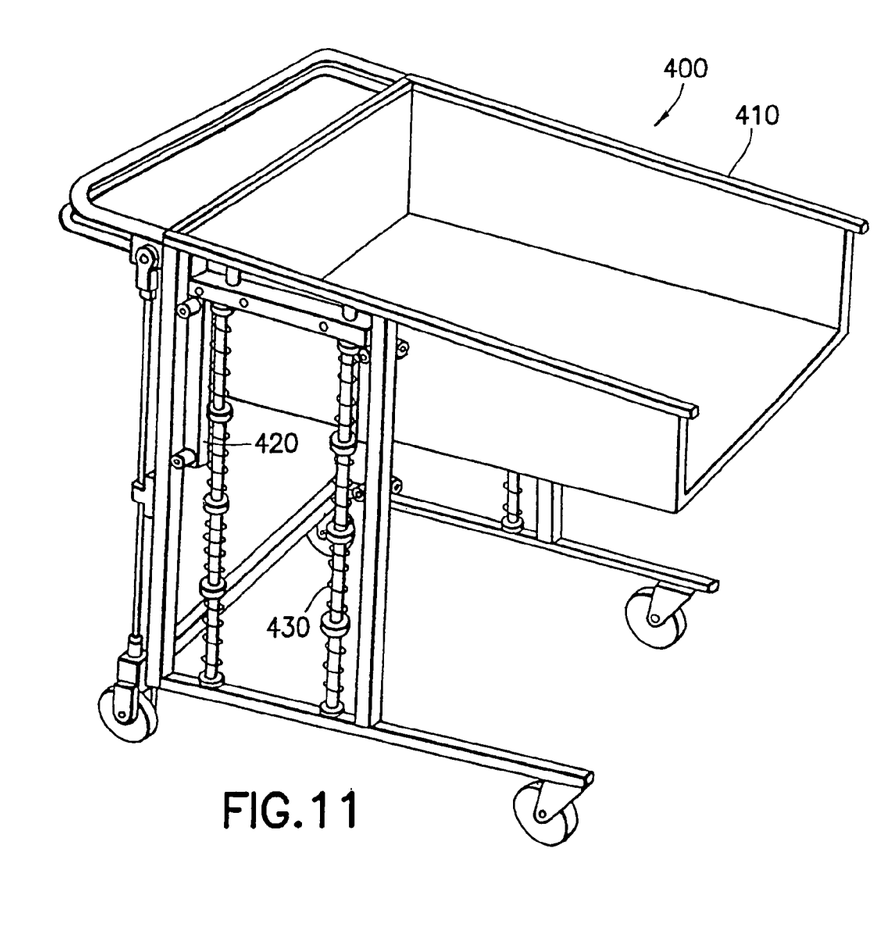
FIG. 11 is a perspective view of another embodiment of the inventive transportation device adapted for industrial use.

A transportation device 400, as shown in FIG. 11 is particular suitable for industrial use and does not require to be nested in a previously parked device. Like the previously disclosed embodiment, device 400 includes a receptacle provided within an outer frame 410 and an inner frame 420. Springs 430 are designed to provide a shock resilient action similarly to the described above one. Industrial device 400 can be fabricated from larger size steel tubing with single springs designed for heavier loads. The distal end of device 400 is open to facilitate the loading and unloading operations. A wheel assembly may be provided an integrally built brake assembly cooperating with distal wheels.

This application describes the inventive transportation device for illustration purposes only. Neither the specific embodiments of the invention as a whole, nor those of its features limit the general principles underlying the invention. The specific features described herein may be used in some embodiments, but not in others, without departure from the spirit and scope of the invention as set forth. Many additional aspects are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

What is claimed is:

1. The transportation device for transporting a load, comprising:
   an outer frame operative to move along an external surface;
   an inner frame removably mounted to the outer frame so that the outer and inner frames are operative to move relative to one another transversely to the surface;
   a receptacle coupled to the inner and outer frames and operative to move with the inner frame in response to a mass of the load carried by the receptacle, wherein the outer and inner frame are configured to minimize at least a torsion force produced by the load during transportation, loading and unloading of the receptacle;
   the outer frame being provided with spaced apart first and second elongated sections extending at least in part along upper and lower substantially planes, respectively;
   a third section extending substantially vertically between the first and second sections; and
   the first section provided with an opening configured to receive the receptacle, the third section being provided with a plurality of spaced apart guiding surfaces configured to slidably guide the inner frame between the first and second sections of the outer frame upon receiving and removing the load in and from the receptacle.

2. The transportation device of claim 1 further comprising a biasing assembly coupled between the first and second sections of the outer frame, the inner frame being provided with two uprights each biased upwardly by the biasing assembly, and a pair of cross-bars coupling the two uprights and configured to support the bottom of the receptacle for simultaneous displacement therewith during displacement of the load into and out of the receptacle.

3. The transportation device of claim 2, wherein the two uprights each have a respective substantially U-shaped cross-section provided with an axially extending member and two flanks extending from opposite axial ends of the axially extending member downwardly towards the second section of the outer frame upon mounting of the inner frame to the outer frame, the axially extending members being resiliently supported by the biasing assembly, the two flanks being configured to slide along the guiding surfaces of the third section of the outer frame between the first and second sections thereof in response to displacement of the load into and out of the receptacle.

4. The transporting device of claim 3, wherein the flanks of the inner frame each have a respective roller unit rotatably guided along a respective one of the guiding surfaces of the third section of the outer frame, the biasing assembly including a plurality of poles each supporting a respective resilient element, the resilient elements each being braced between a respective one of the axially extending member of the inner frame and the second section of the outer frame.

5. The transportation device of claim 4, wherein the resilient elements of the biasing assembly are selected so as to distribute mass of the load, carried by the receptacle, substantially uniformly there between so as to minimize deviation of the receptacle from a substantially horizontal plane during displacement of the receptacle between the first and second sections of the outer frame.

6. The transportation device of claim 5, wherein the resilient elements of the biasing assembly each include a respective at least one spring provided with a uniform or various rate.

7. The transportation device of claim 5, wherein the resilient elements of the biasing assembly each include a respective plurality of springs coupled in succession with one another and provided with various spring rates.

8. The transportation device of claim 4, wherein the third section of the outer frame includes a plurality of spaced apart bars each provided with a respective one of the guiding surfaces, the respective roller unit of the inner frame includes an upper pair of first and second rollers and a lower pair of first and second rollers, the first and second rollers of each pair diverging from one another so as to slide along the respective one of the guiding surfaces.

9. The transportation device of claim 2, wherein the crossbars of the inner frame each have a respective U-shaped cross section including
   a pair of spaced elongated beams extending transversely to the longitudinal axes of the first and second sections of the outer frame and spanning midsections of the two uprights of the inner frame, and
   a pair of vertically extending beams each extending upwards from opposite ends of a respective one of the elongated beams and coupled to a respective one of the uprights of the inner frame, the inner frame further including at least one reinforcing beam extending between and coupling the pair of spaced elongated beams of the crossbars.

10. The transportation device of claim 1, wherein at least the first section includes two axially extending elongated elements and two opposite cross elements bridging proximal and distal ends of the two elongated elements, respectively, the second section being configured to coextend with the first section and having a proximate portion thereof defining a space for receiving a distal portion of a subsequent transportation device, so that the transportation devices are operative to interfit with one another when not in use.

11. The transportation device of claim 10 further comprising a wheel assembly coupled to the second section of the outer frame and operative to rotate about horizontal and vertical axes so as to displace the transportation device in response to a force applied by a device user in all directions, and a brake assembly extending between proximal portions of the first and second sections of the outer frame and operative to release the wheel assembly upon applying an external force by a device user and to arrest displacement of the wheel assembly upon seizing the external force.

12. The transportation device of claim 11, wherein the wheel assembly includes a pair of proximal wheels and a pair of distal wheels, the brake assembly includes:

an actuator mounted to a proximate portion of the first section of the outer frame and pivotal between a transporting position upon applying the external force to the actuator and brake position upon removing the external force, a pair of rods each coupled to the actuator and extending towards a respective one of proximal wheels, a pair of brake pads each coupled to a respective one of the pair of rods and configured to abut an upper segment of the respective proximal wheels so as to arrest displacement thereof upon removing the external force from the actuator and releasing the proximal wheels upon applying the external force t he actuator, and a pair of biasing units each mounted on the respective rod and coupled between the actuator and a respective one of the pair of brake pads so as to bias the respective brake pad against the upper segment of the proximal wheels.

13. The transportation device of claim 12, wherein the brake assembly includes a pair of housings brackets each encasing the respective brake pad, a respective one of the biasing units and a stop all centered on a respective one of the pair of rods, each of the biasing units being braced between the brake pad and the stop.

14. The transportation device of claim 10 further comprising a handle fixedly coupled to or removably coupled to the proximal ends of the two elongated elements of the first section of the outer frame, the handle being ergonomically configured to provide a comfortable grip for a device user.

15. The transportation device of claim 1, wherein the receptacle includes an open top coupled to the outer frame, a bottom tray coupled to the inner frame and a peripheral wall configured to provide displacement of the bottom of the receptacle relative to the open top thereof upon displacing the load into and out of the receptacle.

16. The transportation device of claim 15, wherein the peripheral wall of receptacle is made from material capable of expanding and contracting as the inner frame moves downwardly and upwardly, respectively, upon displacing the load into and out of the receptacle.

17. The transportation device of claim 1, further comprising a seat configured to receive a child and pivotally mounted to the outer frame to rotate outwardly from and inwardly into the receptacle upon applying an external force by a device user.

18. The transportation device of claim 17, wherein the outer frame is provided with a stop element preventing uncontrollable pivoting of the seat out of the receptacle.

19. A transportation device for transporting a load, comprising:

an outer frame operative to move along a surface and having an opening;

said outer frame including spaced apart first and a second sections;

a receptacle suspended on the outer frame within the opening and movable relative to said first and said second sections; and means for absorbing a shock generated by a mass of a load displaceable into and out of the receptacle, means for minimizing torsional forces produced by the load;

said means for minimizing torsional forces, further comprising:

spaced apart guiding surfaces extending from said outer frame between said first and said second sections and engaging said receptacle enabling a slidable guiding of said receptacle relative to said first and second sections.

* * * * *